March 8, 1932.  H. T. SMITH ET AL  1,848,554
ROTARY SNOWPLOW
Filed Nov. 20, 1929  5 Sheets-Sheet 1
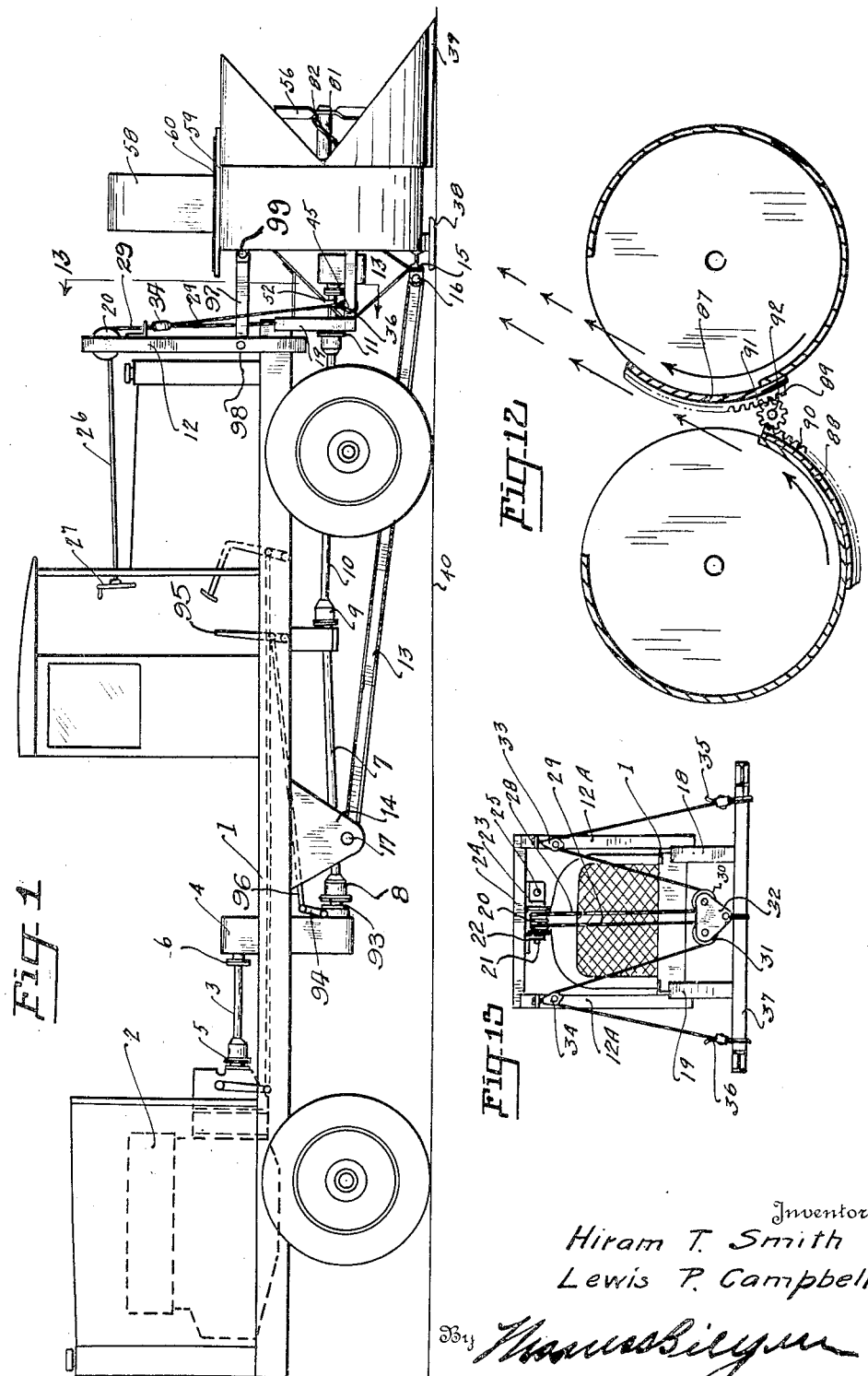
Inventors
Hiram T. Smith
Lewis P. Campbell

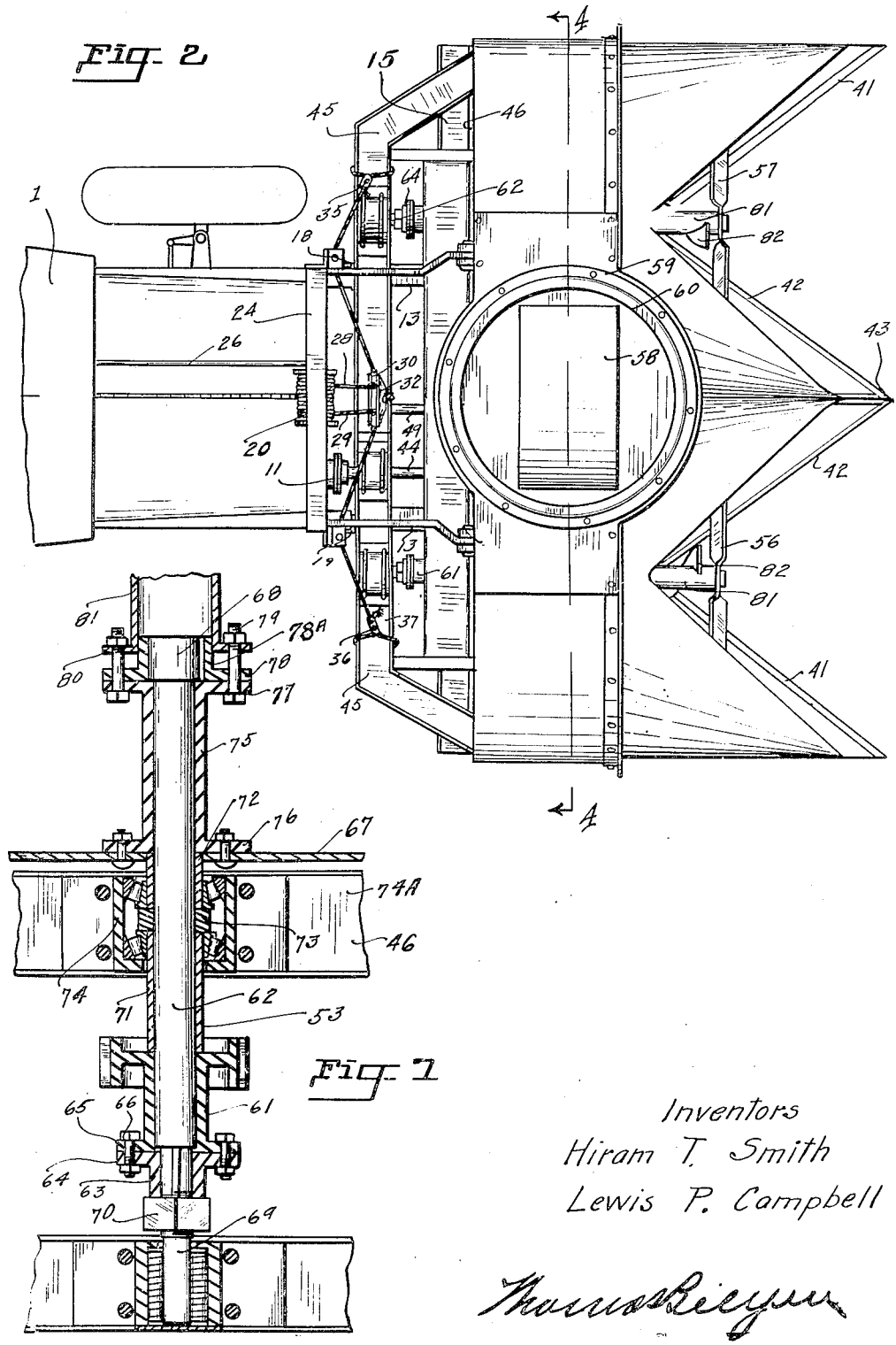

March 8, 1932. H. T. SMITH ET AL 1,848,554
ROTARY SNOWPLOW
Filed Nov. 20, 1929 5 Sheets-Sheet 3
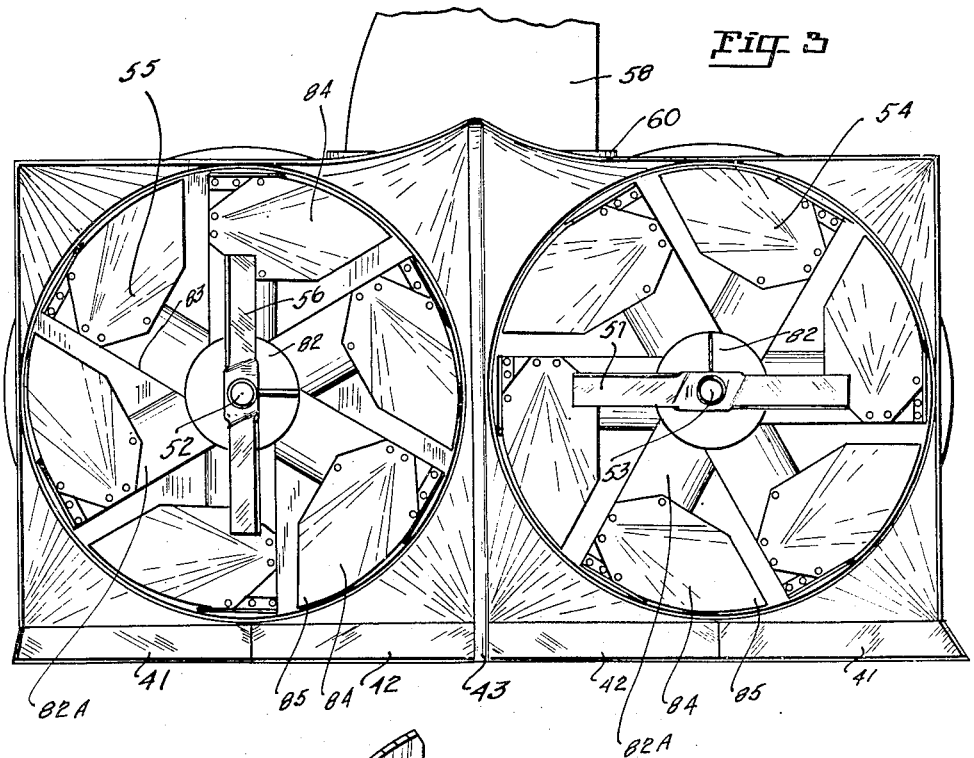
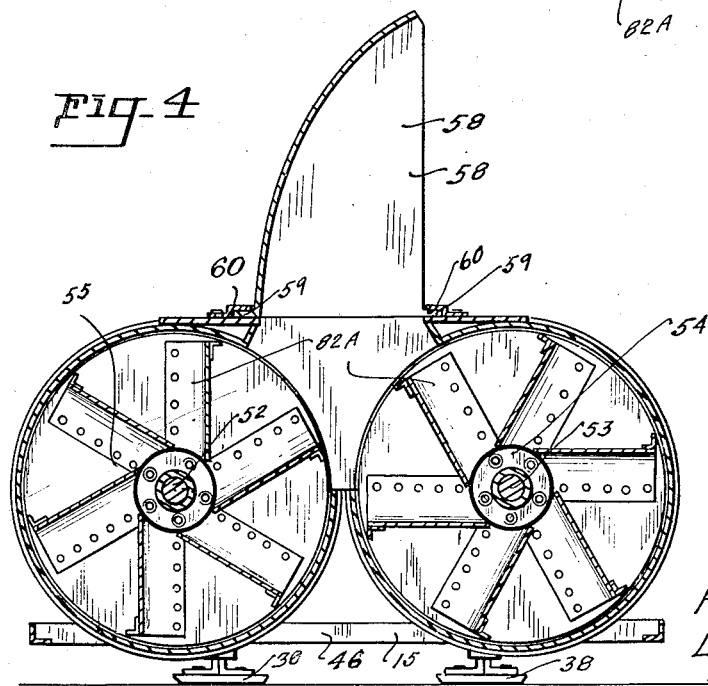
Inventors
Hiram T. Smith
Lewis P. Campbell
By Thomas Kilyu
Attorney March 8, 1932.  H. T. SMITH ET AL  1,848,554
ROTARY SNOWPLOW
Filed Nov. 20, 1929   5 Sheets-Sheet 4
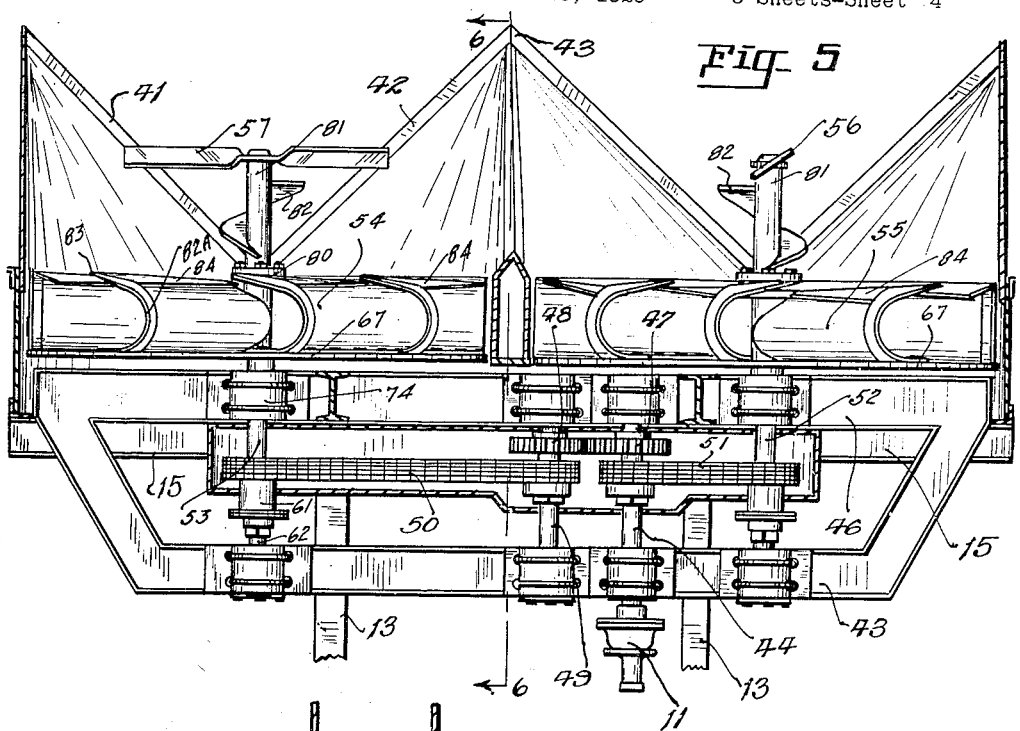
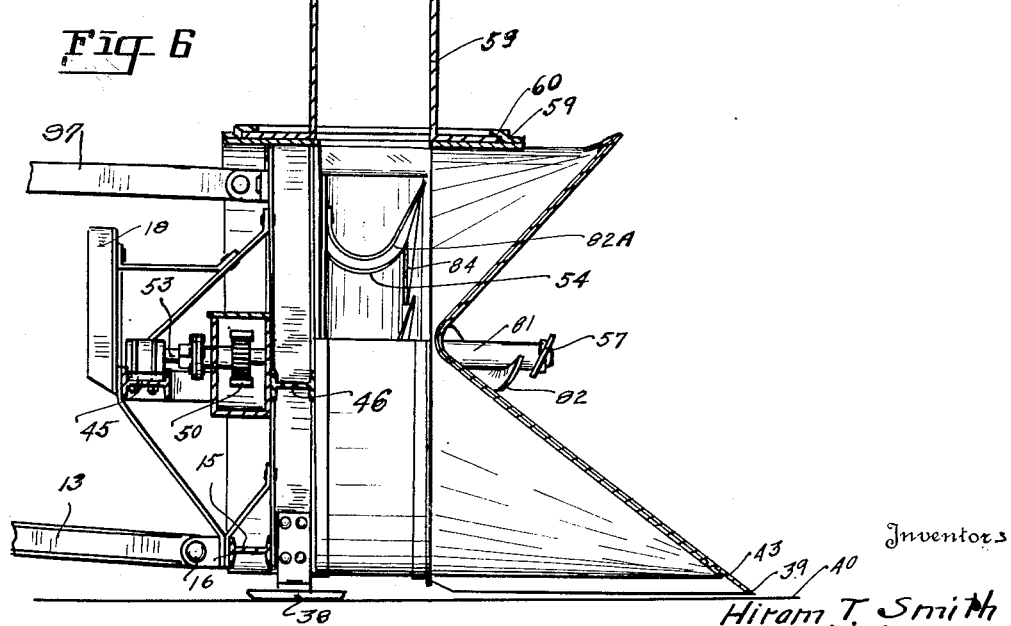
Inventors
Hiram T. Smith
Lewis P. Campbell
By Thomas Bilyeu
Attorney

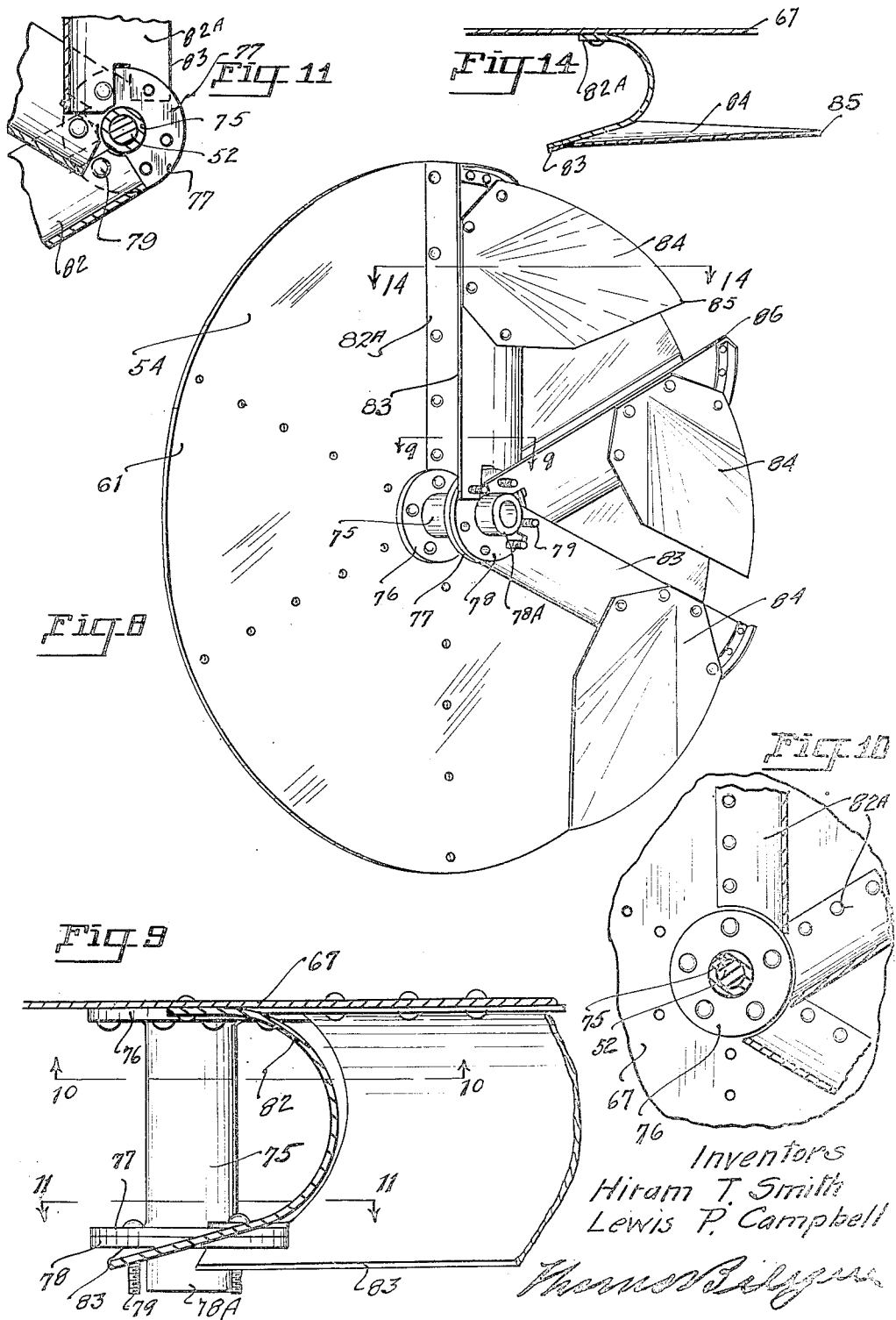

Patented Mar. 8, 1932

1,848,554

UNITED STATES PATENT OFFICE

HIRAM T. SMITH, OF LAGRANDE, AND LEWIS P. CAMPBELL, OF SALEM, OREGON

ROTARY SNOWPLOW

Application filed November 20, 1929. Serial No. 408,538.

Our invention is intended for use in the clearing of roadways, highways, streets and the like from snow and ice and is primarily adaptable for use in conjunction upon motor vehicles, street cars, locomotives and other portable vehicles.

The invention consists primarily of an assembly that is detachably attachable to the vehicle in conjunction with which my new and improved device is to be operated. An independent prime mover is preferably mounted upon the vehicle and a drive shaft extends from the prime mover to the adjustable head mounted upon the one end of the vehicle. Means are provided for the discharge of the material at either side of the head and for raising and lowering the head by manually manipulative elements.

One of the objects of our invention is for the rapid clearing of roadways and trackways of snow and ice and to discharge the same at either side of the roadway.

A further object of our invention consists in providing means that are attachable to a vehicle that may be quickly and easily attached and detached thereto and therefrom and that may be independently driven by a prime mover mounted upon the vehicle.

A further object of our invention consists in providing a device having a plurality of cutter heads that are power driven and that have a breaker head for each cutter head that outwardly extends from the cutter head for partially reducing the material to be handled in advance of the entry of the same into the cutter head.

A still further object of our invention consists in providing a shield for each cutting vane, the purpose of which is to prevent air entering into the stream line of the cutter head to thereby prevent the forming of the materials handled at the back side of each cutting vane.

Still further objects of our invention consist in providing adjustable means for maintaining the front shear blade in uniform spaced relationship with the roadway surface and for substantially removing all of the snow and ice from the roadway due to the precise position of the shear blade relative to the roadway.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a side elevation of the motor vehicle, here shown as an automobile truck, illustrating my new and improved device in position upon the truck and illustrating the prime mover for driving the same mounted at the rear of the motor truck.

Fig. 2 is a top, plan view of the cutter head assembly disposed at the front end of the truck.

Fig. 3 is a front view of the assembled cutter heads and illustrating the blades in position for conducting the materials into the cutter heads.

Fig. 4 is a sectional, front, end view of the cutter head, the same being taken on line 4—4 of Fig. 2 looking in the direction indicated.

Fig. 5 is a sectional, top, plan view of the cutter heads.

Fig. 6 is a sectional, side elevation of the cutter head assembly, the same being taken on line 6—6 of Fig. 5, looking in the direction indicated.

Fig. 7 is a fragmentary, sectional view of the drive shaft assembly of the cutter head.

Fig. 8 is a perspective view of one of the cutter heads and illustrating the shields disposed upon the front edge of the cutter vanes.

Fig. 9 is an enlarged, sectional, top view of a cutter vane, the same being taken on line 9—9 of Fig. 8 looking in the direction indicated.

Fig. 10 is a sectional, side view of the main hub of the cutter head, the same being taken on line 10—10 of Fig. 9 looking in the direction indicated.

Fig. 11 is a sectional, end view, taken on line 11—11 of Fig. 9, looking in the direction indicated.

Fig. 12 is a diagrammatical lay-out of the cutter heads and illustrating the shields manually manipulative for predetermining the side from which the removed material is to be thrown relative to the roadway and to the motor vehicle.

Fig. 13 is a front, elevational view of the supporting elements and the raising and lowering elements for positioning the cutter head relative to the roadway over which the same is to be moved and operated.

Fig. 14 is a fragmentary, sectional view of one of the vanes, the same being taken on line 14—14 of Fig. 8, looking in the direction indicated.

Like reference characters refer to like parts throughout the several views.

We preferably attach our device to an automobile truck, but the device may be used with equal facility upon other forms of propelling mechanisms and we therefore do not wish to be limited to the application of our device to an automotive truck.

We have here shown an automobile truck having a chassis 1 upon which a prime mover, as an oil or gas engine, 2 is placed. A shaft 3 connects the prime mover 2 with a gear reducer that is disposed in the housing 4. Suitable, flexible connections 5 and 6 are disposed between the shaft 3, the prime mover, and the drive disposed within the gear housing 4. The speed reducer disposed in the housing 4 should greatly reduce the speed of the shaft 7. Universal joints 8 and 9 are disposed upon the shaft 7 and a second shaft 10 delivers power from the universal joint 9 to the universal joint 11. A suitable framework 12 is mounted upon the front end of the truck and the same is used as a supporting mechanism for the snow plow assembly that is supported therefrom. A strut 13 connects the supporting bracket 14 and the framework 15 of the snow plow assembly. The strut 13 is directly secured to the elements through connecting pins 16 and 17 to provide a hinging action between the strut and the respective elements to which the same is directly attached. The shaft 10 preferably passes over the front axle of the vehicle and the strut preferably passes under the front axle of the motor vehicle to provide greatest freedom of movement for the snow plow assembly to which the same are directly secured. Referring to Fig. 13 the channelways or guide bars 12A that are disposed at either side of the front end of the motor vehicle act as guides into which the shoes 18 and 19 engage. The snow plow assembly is suspended from a drum 20. The drum 20 is supported upon a shaft 21 that is journaled within the brackets 22 and 23 and the brackets are supported upon the cross yoke 24. The drum 20 carries a power transmission 25, as a worm and worm wheel and a worm is disposed upon the hand actuating shaft 26. The worm coacts with the worm wheel and is adapted for manual manipulation through the hand wheel 27 that is disposed at a convenient location for convenient hand manipulation. Flexible supporting lines 28 and 29 are disposed about the drum 20 and the lines are trained about sheave blocks 30 and 31 that are disposed within the block assembly 32. The flexible lines 28 and 29 pass over sheave blocks 33 and 34 and the lines are secured upon their oppositely disposed free ends 35 and 36 to the frame 37. Adjustable shoes 38 depend from the frame assembly of the device and are adapted to engage upon the roadway to be cleared of snow. The purpose of the shoes is to maintain the shear blade 39 is spaced relationship with the surface 40 to be cleared of snow and ice. The shear blade assembly is composed of two blades 41 and 42 for each of the rotary cutters of the plow. We have found that best results are obtained for the clearing of the roadway wherein two rotary cutters are assembled within each plow unit. The blades 41 and 42 meet at a common center, the angle being sufficient to crowd or lead the snow directly into the cutter heads. The nose 43 of the plow is disposed central of the assembly. Referring to Fig. 5 a stub shaft 44 extends forward from the universal joint 11 and is journaled within suitable bearings supported within the frame members 45 and 46 that form the supporting frame for the snow plow assembly. We have found that splendid results may be obtained and economical construction be secured, as well, by the fabricating of the frame out of structural shapes, welded or otherwise, secured together. A gear 47 is mounted upon the shaft 44 and the same coacts with a gear 48 that is disposed upon the stub shaft 49. The stub shaft 49 is journaled within suitable bearings mounted within the frame. Driving elements 50 and 51, as belts or chains, are driven from pulleys or sprockets that are disposed upon the shafts 44 and 49, respectively, and driven pulleys, or sprockets, are mounted upon the cutter head shafts 52 and 53. The cutter head shafts 52 and 53 are journaled within suitable bearings mounted within the frame and cutter heads 54 and 55 are mounted upon the respective cutter head shafts. The shafts 52 and 53 extend forward of the main cutter head and breaker blades 56 and 57 are mounted upon the forward end of the cutter head shafts. The purpose of these breaker blades is to partially pulverize the ice or snow bank that is to be reduced, in order that the same may be passed into the cutter heads themselves. A common discharge 58 is mounted upon a turntable 59 and a flange 60 is disposed on the outer, lower end of the discharge head that is adapted to engage within a suitable raceway, disposed within the base of the turntable and rotation of the discharge head within the turntable facilitates the discharge of the materials being removed at either side of the roadway. The cutter heads are rotated in opposite directions in order that the discharge may be effected through a common outlet. The cutter head shafts and the coacting elements are illustrated in detail in Fig. 7. The driving pulley or sprocket is formed integral with a hub 61 and a shaft 62 runs longitudinally of the assembly. A flanged hub 63 is fixedly and removably secured to the shaft 62 and a flange 64 is disposed upon the hub 63 and the same is secured to the flange 65, disposed upon the hub 61, by any suitable fastening means as by bolts 66. The bolts 66 should be so dimensioned that the same will break when the cutter head 54 engages any obstruction that would tend to damage the machine if the driving pressure were not limited by any safety device of some sort and this is provided by the making of the fastening bolts 66 of any suitable material that will not have a factor of safety beyond the safe amount.

The shaft 62 has a head 68 disposed upon its outer end and the same is stepped down in decreasing diameters from the head 68 to the smaller end 69. A threaded nut 70 is disposed upon the shaft and maintains the assembly together. Sleeves 71 and 72 are disposed about the shaft and a bearing 73 is disposed upon the shaft. The hub 74 forms the bearing for the driving assembly and is mounted directly upon the cross frame member 74A. The hub 75 of the cutter head has flanges 76 and 77 disposed at the oppositely disposed ends of the same and the flange 76 is secured directly to the plate 67 that forms the back wall of the cutter head. A flange 78 that is formed integral with the hub 78A is secured to the flange 77 by any suitable fastening means, as by bolts 79, and the front spokes of the cutter head are disposed between the flange 78 and the flange 80 that terminates the inner end of the hollow shaft 81. The hollow shaft 81 also engages upon the front end of the hub 78A. A worm 82 is disposed about the hollow shaft 81 and the breaker blades 56 and 57 are secured to the outer ends of each of the hollow shafts. The purpose of the worm 82 is to feed the broken material directly into the cutter head itself.

Referring to Figs. 8, 9, 10 and 11 the cutter head is composed primarily of a rear plate member 67 and equally spaced about the plate 67 and hub 75 are a plurality of cutter vanes 82A. The cutter vanes are made somewhat arcuate in cross sectional area and are preferably made of plate material with a shearing edge 83 formed upon the outside of the vane. The front wall of the vane is rearwardly inclined to permit of a crowding of the shearing edge of the vane into the bank of the material that is to be cut and removed from the highway or roadway.

Protector wings 84 are secured to the front edge of the cutter vane and the same perform the dual function of strengthening the cutter vane adjacent the cutting edge, or the shearing edge, of the vane and at the same time preventing air currents forming within and at the rear of the cutter vane to thereby prevent the lighter particles of snow and ice from being trapped within the next succeeding cutter vane. We have found that the placing of these wings 84 as illustrated in Fig. 8 upon the cutter head greatly increases the operating efficiency of the cutter heads. Blades 86 are secured to the end of the cutter vanes 82A which are adapted to act as scraping knives for the inside of the drums in which the cutter vanes rotate, as illustrated in Fig. 4, and also strengthen the cutter vane structure.

The free end 85 of the wings should be inclined inwardly sufficiently to permit of a free cutting of the bank by the next succeeding shearing edge. The free end 85 should be sufficiently spaced apart from the cutting blade 86 to permit of a free feeding of materials to be discharged into the respective vaned cutters.

Referring to Fig. 12, adjustable shields 87 and 88 are provided adjacent the discharge outlet for the cutter heads and the same are positioned by suitable mechanism as by the placing of rack segments 89 and 90 about the outer periphery of the same. The shields may be manipulated by a pinion 91 that coacts with the gear segments disposed upon the outer surface of the shields 87 and 88. The pinion 91 is mounted upon a shaft 92.

A clutch 93 is disposed at the power outlet end of the speed reducer 4 and terminates the driven end of the shaft 7. A clutch actuating lever 94 is associated with the clutch and is adapted for being actuated through the hand lever 95. A link 96 connects the hand lever 95 with the clutch arm 94. Struts 97 connect the frame with the raising and lowering mechanism for positioning the snow plow assembly relative to the roadway and the truck, and are pivotally connected on their oppositely disposed ends to pins 98 and 99. The struts 97 and the struts 13 take the full thrust of the crowding load that is exerted upon the snow plow assembly during the operation of the device.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What we claim is:

1. In a device of the class described, a shaft mounted within an adjustable fabricated frame, a housing for said shaft, said shaft adapted for being driven through a hub mounted thereupon, safety fastening bolts extending through a flange disposed upon the driving hub, a cutter head plate secured to the shaft, a hub disposed upon the shaft to which the cutter blade is secured, a second hub secured to the hub to which the cutter head plate mounted upon the head of the shaft is secured, cutter vanes having shearing edges disposed in spaced relationship with each other mounted upon the first mentioned hub, protector wings disposed upon the forward side of the cutter vanes and said protector wings being inwardly disposed from the line of movement of the shearing edges of the cutter vanes and rearward from the shearing blade.

2. In a device of the class described, the combination of a shaft, a flanged hub mounted upon the shaft, a cutter head plate secured to the flange of the hub, a plurality of cutter vanes having shearing edges disposed upon the hub and secured to the hub and to the cutter head plate, a protector wing secured to each of the cutter vanes adapted to prevent the forming of snow and ice particles upon the rear of the vaned cutters by the preventing of the forming of air currents or air pockets upon the rear wall of the cutter vane and within the next succeeding cutter vane disposed rearwardly therefrom when the cutter vane is in rotation.

3. A cutter head for a snow plow comprising a hub, a plate secured to the hub, a plurality of vaned cutter heads secured to the plate and the hub, and a protector wing secured to the cutting edge of each of the vanes and rearwardly extending therefrom and adapted for preventing the forming of air currents within the space disposed between the respective spaced vanes.

4. A cutter head for a snow plow comprising a driven hub, an annular plate secured to the hub, a plurality of cutter vanes secured to the plate and to the hub, the outer edge of the cutter vane forming the cutting edge for the vane, and a protector wing secured to the outer edge of the cutter vane and rearwardly extending therefrom.

5. In a device of the class described, the combination of a driven shaft, a cutter head secured to the shaft comprising an annular plate, spaced cutter vanes substantially arcuate in cross section secured to the plate and the hub and in spaced relationship with each other, and a protector wing secured to each of the vanes and rearwardly extending therefrom and the rear edge of which terminates in spaced relationship with the cutting edge of the next succeeding cutter vane.

6. In a device of the class described, the combination of a power-driven shaft, a hub secured to the shaft and adapted for being driven thereby, a plate secured to the hub, a plurality of cutter vanes secured to the hub and the plate, a protector wing secured to each of the cutter vanes and rearwardly extending therefrom, and means for conducting snow and ice into the cutter vanes.

HIRAM T. SMITH.
LEWIS P. CAMPBELL.